2,970,484
                    Patented Feb. 7, 1961

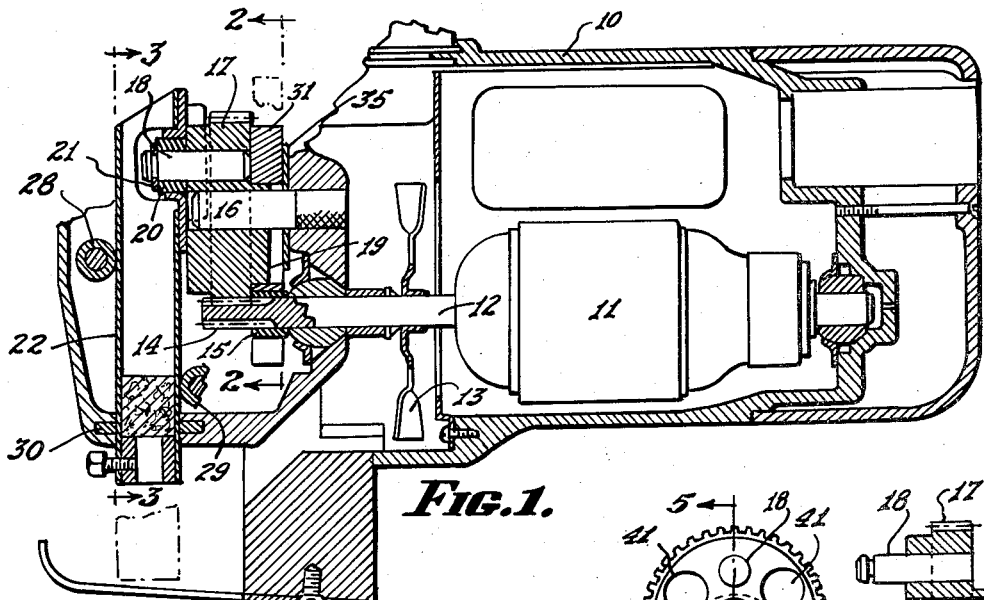
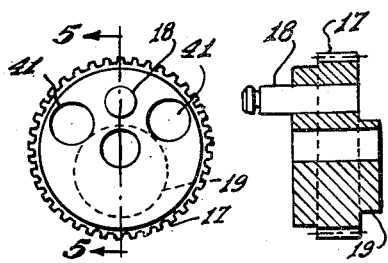
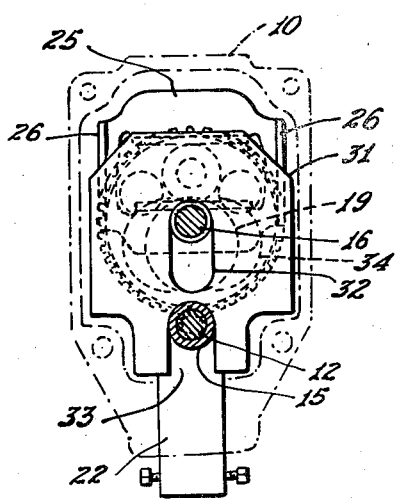
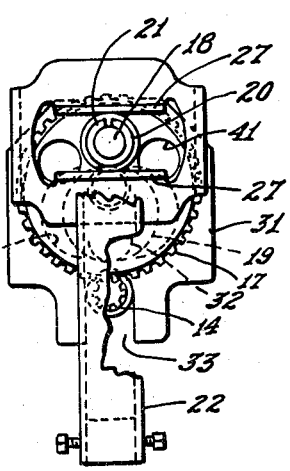

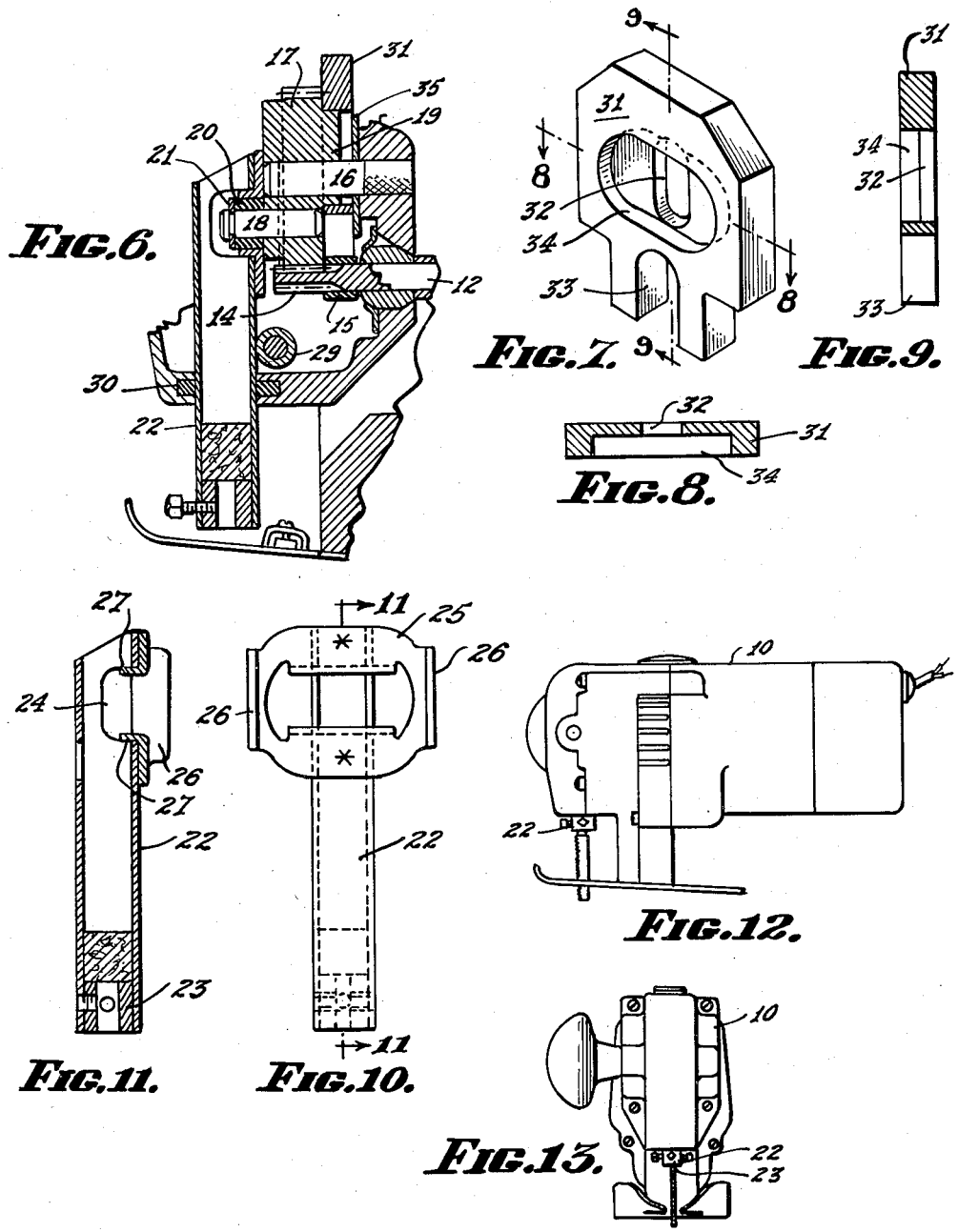

2,970,484
BALANCING MECHANISM FOR SABRE SAWS AND THE LIKE

William E. Springer, Springfield, Ohio, assignor to Robbins & Myers, Inc., Springfield, Ohio, a corporation of Ohio Filed Apr. 20, 1959, Ser. No. 807,696

3 Claims. (Cl. 74—50)

This invention relates to a counterbalancing mechanism and more particularly to a counterbalancing mechanism for portable electric sabre saws and the like. With the increasing acceptance of the "do it yourself" philosophy, there has been an increasing demand for home power tools of all types. From the sales standpoint it is desirable that power tools intended for use in the home workshop be as simple as possible, as light as possible, and as free from vibration as possible in order that their use will not be fatiguing.

In any power tool or similar device wherein an element is caused to reciprocate at high speed, tremendous vibration results and such vibration is extremely fatiguing to the user. Various arrangements and mechanisms have been proposed for counterbalancing the reciprocating parts, but all such systems have been insufficient, or fairly complicated and relatively expensive. It is therefore an object of the present invention to provide a counterbalancing mechanism, which, while it is useful in a variety of applications, is herein specifically illustrated in connection with the so-called portable electric sabre saw.

Generally speaking, a portable electric sabre saw comprises a housing or casing which can be grasped in the hand, and within which there is provided an electric motor. Generally the electric motor has a shaft carrying a pinion which cooperates with a gear, and the gear in turn drives a ram or reciprocating member through a so-called scotch yoke connection. The ram is provided with a chuck in which a sabre saw blade may be mounted.

It is an object of the present invention to provide a counterbalancing mechanism which will effectively counterbalance the reciprocating movement of the ram, chuck, saw blade, and associated parts and also effectively counterbalance eccentric revolving parts. It is a further object of the invention to provide such a counterbalancing mechanism which takes up very little space, and which is extremely simple, and therefore not likely to get out of order.

These and other objects of the invention which will be described in greater detail hereinafter or which will be apparent to one skilled in the art upon reading these specifications, I accomplish by that certain construction and arrangement of parts, of which I shall now disclose an exemplary embodiment.

Reference is made to the drawings, forming a part hereof, and in which Figure 1 is a vertical cross-sectional view through a portable electric sabre saw according to the present invention, Figure 2 is a cross-sectional view thereof taken on the line 2—2 of Figure 1, Figure 3 is a cross-sectional view thereof taken on the line 3—3 of Figure 1, Figure 4 is an elevational view of the gear which, according to the present invention drives the scotch yoke mechanism and also the counterbalancing mechanism, Figure 5 is a cross-sectional view of the same taken on the line 5—5 of Figure 4, Figure 6 is a fragmentary view similar to Figure 1 but showing the parts at the opposite end of the stroke, Figure 7 is a perspective view of the counterbalancing weight, Figure 8 is a cross-sectional view thereof taken on the line 8—8 of Figure 7, Figure 9 is a cross-sectional view of the same taken on the line 9—9 of Figure 7, Figure 10 is a front elevational view of the ram and scotch yoke, Figure 11 is a cross-sectional view of the same taken on the line 11—11 of Figure 10, Figure 12 is an elevational view of the complete sabre saw, and Figure 13 is a front elevational view of the same.

Briefly, in the practice of the invention, I provide on the gear which drives the scotch yoke mechanism, on the face opposite the crank pin, and diametrically opposed to the crank pin, an eccentric hub. This hub cooperates in the manner of a scotch yoke with a counterweight which is guided in its reciprocating movement by contact with the stub shaft upon which the gear is mounted and also the motor shaft upon which the pinion is mounted.

Referring now more particularly to the drawings, a casing or housing is shown at 10 and within this housing there is mounted an electric motor 11. The details of the motor and its mounting do not constitute a part of the present invention and will therefore not be described in detail. The motor, as is conventional, carries on its shaft 12 the impeller 13 by means of which a current of air is caused to pass over the motor for cooling purposes.

At its end the motor shaft 12 is provided with a pinion 14. This may be done by cutting the teeth of the pinion right in the motor shaft. Adjacent the pinion 14 the shaft carries a bearing sleeve 15.

A stub shaft 16 is mounted in the housing 10 and carries a gear 17. The gear 17 is seen in more detail in Figures 4 and 5. As will be clear from the drawings the gear 17 is provided with the crank pin 18 and is also provided with the eccentric hub 19 on the face opposite the crank pin 18, and diametrically opposite the crank pin 18.

The crank pin 18 is provided with the yoke roller 20 which is held in place by the split ring 21 in conventional manner. The ram of the sabre saw is indicated at 22 and in the example shown is made of sheet metal tubing. It is shown in greater detail in Figures 10 and 11. As will be clear it is of generally square configuration and carries at its lower end a chuck 23 in which a sabre saw blade may be secured. Since the chuck forms no part of the present invention it will not be described in detail. The tubular member 22 is cut away as indicated at 24 and a scotch yoke 25 is spot welded to the member 22 as best seen in Figure 10. The member 25 is provided with the guide flanges 26 which guide it in its reciprocating path and is also provided with the transverse slot constituted by the turned-up edges 27 of the plate 25. The opposed and parallel flanges 27 provide the bearing surfaces for the yoke roller 20 described above.

As will be clear from Figure 1 the ram 22 is held in alignment by contact with the guide rollers 28 and 29 and has a slide bearing at 30 in the casing 10.

It will now be clear that as the motor shaft 10 rotates the pinion 14 will transmit the rotary motion of the shaft 12 to the gear 17 which in turn will rotate on its stub shaft 16 whereby the crank pin 18 will move in a circular path. The yoke roller or sleeve 20 on the crank pin will slide back and forth between the flanges 27 of the scotch yoke 25 as a result of which only the vertical component of the circular movement of the crank pin 18 will be transmitted to the ram 22, which thus will reciprocate in a vertical path.

It is this reciprocatory movement of the ram and its associated parts which must be counterbalanced. Reference has been made to the eccentric hub 19. It is the hub 19 which has a scotch motion type connection with the counterweight to accomplish the counterbalancing problem. Reference is made to Figures 7-9 inclusive for a description of the counterweight. The counterweight is generally indicated at 31. It is provided with the vertical slot 32 through which the stub shaft 16 passes and also with a slot or fork 33 through which the motor shaft passes. The slots 32 and 33 limit the movement of the counterweight 31 to a vertical reciprocating motion. The counterweight 31 is also provided with the transverse slot or opening 34 which is of a width to accommodate the aforementioned eccentric hub 19. The eccentric hub 19 cooperates with the slot 34 in the form of a scotch yoke mechanism so that as the gear 17 rotates, causing the eccentric hub 19 also to rotate, the hub 19 slides back and forth in the slot 34 and transmits to the counterweight 31 only the vertical component of its rotary movement. Thus the counterweight 31 is caused to reciprocate in a plane parallel to the ram and its associated parts, and in a plane formed by the axes of the motor shaft 12 and stub shaft 16.

The width of the slot 33 is such that it slidingly fits over the bearing sleeve 15. A bearing washer 35 is provided between the counterweight 31 and the housing 10.

From the foregoing description it will now be understood how the counterbalancing has been achieved. Basically, a reciprocating mass can only be counterbalanced effectively by an opposing reciprocating mass having the same frequency and it is necessary that the product of the weight and amplitude of the two masses must be equal. It is also true that a mass revolving about an axis other than its center of gravity can only be effectively counterbalanced by an opposing revolving mass having the same direction and speed of rotation, and the product of the weight and radius to the center of gravity of the two masses must be equal. It is also important that the centers of gravity of the masses in either of the cases above described, should be moving in the same plane. If on account of the requirements of construction it is impossible that they move in the same plane, then the closer to each other the planes of movement are, the more nearly perfect the counterbalancing will be.

It will be observed that the reciprocating parts of the sabre saw which include the ram 22, the scotch yoke 25, the chuck 23 and the saw blade (not shown) have a certain combined weight and a certain total distance of movement in the vertical direction. The counterweight has a certain weight and its total movement in the vertical direction is fixed. In building a device according to the present invention the product of the total weight and distance of movement of the ram and its associated parts is made equal to the product of the weight and distance of movement of the counterweight.

The unbalanced revolving parts include the crankpin 18, the yoke roller 20 and the split ring 21 and these have a certain combined weight and a certain radius of rotation. Their mass is substantially counterbalanced by the eccentric hub 19 and the counterbalancing is completed by making the portion of the gear 17 opposite the pin 18 somewhat heavier by drilling holes adjacent the crank pin 18 as indicated at 40 and 41 in Figure 4.

While the reciprocating masses and their counterweight masses and the rotating masses and their counterbalancing masses are not in the same plane, it will be observed from Figure 1 that these planes are very close together. It will then be seen that I have provided a very compact and highly effective counterbalancing arrangement.

It will be understood that numerous modifications may be made without departing from the spirit of the invention and I therefore do not intend to limit myself otherwise than as set forth in the claims which follow.

Having now fully described the invention what I claim as new and desire to secure by Letters Patent is:

1. In a device wherein an electric motor having a shaft drives a reciprocating member through a pinion and gear and a crank pin on one face of said gear cooperating with a slot on said reciprocating member; a counterbalancing means comprising an eccentric hub on said gear diametrically opposed to said crank pin on the opposite face of said gear, and having a mass and eccentricity to substantially counterbalance the mass and eccentricity of said crank pin, and a counterweight having a slot accommodating said eccentric hub, a stub shaft fixedly mounted on said motor parallel to and spaced from said motor shaft, said gear being mounted on said stub shaft, a slot in said counterweight through which said stub shaft passes in guiding relation, and a slot in said counterweight through which said motor shaft passes in guiding relation, said last named slots being parallel to a line through the axes of said stub shaft and motor shaft and confining the movement of said counterweight to a line parallel to the movement of said reciprocating member, the weight and extent of movement of said counterweight substantially counterbalancing the weight and extent of movement of said reciprocating member.

2. A portable electric sabre saw comprising a housing, an electric motor mounted in said housing, said motor having a shaft having a pinion, a stub shaft fixed in said housing parallel to and spaced from said motor shaft, a gear rotatably mounted on said stub shaft in position to mesh with said pinion, a crank pin secured to said gear eccentrically thereof, a ram mounted for reciprocating movement in the plane of the axes of said stub shaft and motor shaft, a scotch yoke connection between said crank pin and said ram, said gear having on the face opposite said crank pin and diametrically opposite said crank pin an eccentric hub, a counterweight having a slot through which said stub shaft passes in guiding relation, and a slot through which said motor shaft passes in guiding relation, said last named slots being parallel to a line through the axes of said stub shaft and motor shaft, for guiding said counterweight in a reciprocating path parallel to said ram, and a scotch yoke connection between said eccentric hub and said counterweight, the mass and eccentricity of said hub being substantially such as to counterbalance the mass and eccentricity of said crank pin and associated parts, and the mass and reciprocating travel of said counterweight being such as to counterbalance the mass and reciprocating travel of said ram and its associated parts.

3. A portable electric sabre saw comprising a housing, an electric motor mounted in said housing, said motor having a shaft provided with a bearing sleeve and a pinion, a stub shaft fixed in said housing parallel to and vertically spaced from said motor shaft, a gear rotatably mounted on said stub shaft in position to mesh with said pinion, a crank pin secured to said gear eccentrically thereof and carrying a bearing sleeve, a ram having a blade chuck mounted for vertical reciprocating movement in said housing and having a horizontal slot in which the bearing sleeve on said crank pin engages to constitute a scotch yoke mechanism, said gear provided on its face opposite said crank pin with an eccentric hub diametrically opposite said crank pin, and a counterweight having a vertical fork guidingly engaging over the bearing sleeve on said motor shaft, a vertical slot for the passage of said stub shaft in guiding relation, and a transverse slot in which said eccentric hub engages constituting also a scotch yoke mechanism, the product of the weight of said counterweight and its total movement in one direction being equal to the product of the total weight of said ram, chuck, blade and first named scotch yoke mechanism and the total movement thereof in one direction, the weight of said crank pin and its bearing sleeve being substantially counter-balanced by said eccentric hub, and said gear having holes to lighten it in the area of said crank pin to complete the balance of the weight of said crank pin and sleeve.

References Cited in the file of this patent

UNITED STATES PATENTS

| | | |
|---|---|---|
| 2,345,383 | Curtis | Mar. 28, 1944 |
| 2,501,631 | Oschwald | Mar. 21, 1950 |